US007269575B1

(12) United States Patent
Concannon et al.

(10) Patent No.: US 7,269,575 B1
(45) Date of Patent: Sep. 11, 2007

(54) SYSTEM AND METHOD FOR PROCESSING FOREIGN CURRENCY PAYMENT INSTRUCTIONS CONTAINED IN BULK FILES

(75) Inventors: Andrea Concannon, Sufferu, NY (US); Mark Stuparich, Baldwin, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 09/438,590

(22) Filed: Nov. 12, 1999

Related U.S. Application Data

(60) Provisional application No. 60/108,284, filed on Nov. 13, 1998.

(51) Int. Cl.
*G06Q 40/00* (2006.01)
(52) U.S. Cl. .......................................... 705/39; 705/37
(58) Field of Classification Search .................. 705/38, 705/39, 40, 42, 43, 44, 35, 37; 380/24, 49, 380/9, 25
See application file for complete search history.

(56) References Cited

U.S. PATENT DOCUMENTS

| | | | | |
|---|---|---|---|---|
| 5,375,055 A | * | 12/1994 | Togher et al. ................. | 705/37 |
| 5,465,206 A | * | 11/1995 | Hilt et al. ...................... | 705/40 |
| 5,717,868 A | | 2/1998 | James | |
| 5,774,553 A | * | 6/1998 | Rosen ........................... | 705/39 |
| 5,787,402 A | * | 7/1998 | Potter et al. ................... | 705/37 |
| 5,825,003 A | * | 10/1998 | Jennings et al. ............. | 235/379 |
| 5,852,812 A | * | 12/1998 | Reeder ......................... | 705/39 |
| 5,920,847 A | * | 7/1999 | Kolling et al. ................ | 705/40 |
| 5,963,647 A | * | 10/1999 | Downing et al. ............ | 235/379 |
| 5,978,485 A | * | 11/1999 | Rosen ........................... | 380/49 |
| 6,058,378 A | * | 5/2000 | Clark et al. ................... | 705/37 |
| 6,058,380 A | * | 5/2000 | Anderson et al. ............. | 705/40 |
| 6,098,053 A | * | 8/2000 | Slater ........................... | 705/44 |
| 6,205,433 B1 | * | 3/2001 | Boesch et al. ................ | 705/39 |
| 6,324,525 B1 | * | 11/2001 | Kramer ........................ | 705/40 |

(Continued)

FOREIGN PATENT DOCUMENTS

EP 0848361 6/1998

(Continued)

OTHER PUBLICATIONS

"Chase Manhattan Introduces New Fedi Payables Product" Cash Management News. London: May 1995., Iss 109; p. 5, 2 pgs.*

(Continued)

*Primary Examiner*—Richard E. Chilcot, Jr.
*Assistant Examiner*—Jennifer L. Liversedge
(74) *Attorney, Agent, or Firm*—Hunton & Williams LLP

(57) ABSTRACT

A system an method allowing customers of a banking institution to transmit bulk files of payment instructions to the bank for execution. The payment instructions may include a mix of domestic or international Automated Clearing House (ACH) transactions, domestic or international wire transfers, multibank transactions and instructions to print checks drawn on the receiving bank or at another bank. For payments requiring payment in a foreign currency in which the customer does not have an account the present invention automatically generates and executes a contract for the foreign exchange (FX) to obtain the currency required to fulfill the payment instruction. The automatic FX process can furthermore use a real time feed of foreign exchange rates as opposed to the static rates traditionally applied to such contracts.

13 Claims, 4 Drawing Sheets

U.S. PATENT DOCUMENTS 6,721,715 B2 *  4/2004  Nemzow .................... 705/35

FOREIGN PATENT DOCUMENTS

| | | |
|---|---|---|
| EP | 0949596 | 10/1999 |
| WO | 9506294 | 3/1995 |

OTHER PUBLICATIONS

Steven Marjanovic. "Corporate Services: Chase Gears up Global Payments System Series: 16", American Banker (pre-1997 Fulltext). New York, N.Y.: Sep. 11, 1995.vol. 160, Iss. 174; p. 41.*

"Operating in a Multi-Currency Environment", Asiamoney. London: Oct. 1995. p. 6, 4 pgs.*

Reinbach, Andrew. "Chase Steps up Treasury System", Bank Systems & Technology. New York: Nov. 1995.vol. 32, Iss. 11; p. 29, 2 pgs.*

"Chasing the Global Trend", Cash Management News. London: Dec. 1995., Iss. 115; p. 8, 3 pgs.*

Gluck, Andrew. "Creating a Global Cash-Management Game Plan Bank Systems & Technology." New York Feb. 1997. vol. 34, Iss. 2; p. 28, 4 pgs.*

"Systems spell change for foreign exchange", Global Investor. London: Nov. 1996., Iss. 97; p. 18.*

Sherree DeCovny. "Net Scope", Banking Technology. London: May 1997.vol. 14, Iss. 4; p. 28, 4 pgs.*

Teitelman, Robert. Inside the State Street machine. Institutional Investor. New York: Jun. 1994. vol. 28, Iss. 6. (12 pages).*

"Networks Cross Wall Street" Informationweek, Oct. 9, 1989, pp. 40-44, XP002135954.

Patent Abstracts of Japan, JP 09311891A, Mitsubishi Electric Corp., Dec. 2, 1997.

* cited by examiner

Payment Aggregation Example

| | PAYSOURCE TRANSACTIONS | Acct. No. | | Chase Trader Transactions | |
|---|---|---|---|---|---|
| 200— | PAY 10 GBP TO PARTY A | A123 | | 1 Trade for 30 GBP | —214 |
| 202— | PAY 10 DEM TO PARTY A | A123 | | 1 Trade for 10 GBP | —216 |
| 204— | PAY 10 GBP TO PARTY B | A123 | Aggregate to → | 1 Trade for 20 DEM | —218 |
| 206— | PAY 10 GBP TO PARTY C | A123 | | 1 Trade for 10 DEM | —220 |
| 208— | PAY 10 DEM TO PARTY C | A123 | | 4 Payments to Party A | |
| 210— | PAY 10 GBP TO PARTY A | B456 | | 1 Payment to Party B | |
| 212— | PAY 10 DEM TO PARTY A | B456 | | 2 Payments to Party C | |

*FIG. 4*

SYSTEM AND METHOD FOR PROCESSING FOREIGN CURRENCY PAYMENT INSTRUCTIONS CONTAINED IN BULK FILES

CROSS REFERENCE TO RELATED APPLICATIONS

This application is based on and claims priority to U.S. Provisional Patent Application No. 60/108,284, filed Nov. 13, 1998, entitled BULK FILE PAYMENT SYSTEM USING EDI, the entire disclosure of which is hereby incorporated by reference.

FIELD OF THE INVENTION

The present invention generally relates to the execution of payment instructions and more particularly to a system and method for accepting a bulk file of payment instructions of different types and executing foreign exchange trades, when necessary, to fulfill the payment instructions.

BACKGROUND OF THE INVENTION

Two important services offered by financial institutions (banks) to its customers is the ability to make payments from the customer's accounts and the ability to execute the exchange of one currency. Currency exchange is also known as foreign exchange or FX. Customer payments are typically made in the form of wire transfers, checks or cross border wire transfers (transfers across national borders) to a beneficiary. Often a transaction by a customer will require both a foreign exchange and a payment. The FX transaction must take place first in order to obtain the correct currency for the payment (e.g., a payment in Deutschmarks (DEM) to a vendor in Berlin).

Historically, customers had to arrange such payments and foreign exchange on a one by one transactional basis. In an effort to reduce expenses, corporations are willing to allow trusted third parties, such as banks, to assume some of the functions associated with the payments process. Rather than support multiple processes internally to initiate different payment types, these corporations want their banks to assume some of these responsibilities. This form of outsourcing eliminates exception processing by the corporation and streamlines their payables operation An existing solution for customers who do not maintain foreign currency accounts is to create an import file that could be transmitted to the bank where the FX deals could be contracted and settled. However presently, this solution requires manual intervention on the part of the customer to contract FX and release the payment. There is accordingly a need in the industry for a system which can receive payment and FX instructions from a customer and automatically execute the required FX contracts and settle the payments with the resulting funds from the foreign exchange.

SUMMARY OF THE INVENTION

The present invention allows customers of a financial institution (e.g., a bank) to transmit bulk files of payment instructions to the bank for execution. The payment instructions may include domestic or international Automated Clearing House (ACH) transactions, domestic or international wire transfers, multibank transactions and instructions to print checks drawn on the receiving bank or at another bank. The source of these payments is usually the customer's accounts payable system and the purpose is to pay vendors or reimburse employees for expenses.

If a customer regularly makes payments in a foreign currency, it will generally, but not always, maintain an account in that currency. The present invention processes these instructions to make payments from these foreign currency accounts. Some customers do not have accounts in each of the foreign currencies in which they have to make payments, usually because the need to execute payments in foreign currencies is only occasional. In processing these types of payment instructions relating to foreign currencies, the present invention automatically generates and executes a contract for the foreign exchange (FX) required to fulfill the payment instruction. Furthermore, the automatic FX process uses a real time feed of foreign exchange rates as opposed to the static rates traditionally applied to such contracts.

The ability for customers to send a single file leads to significantly more streamlined and efficient processing. The use of real time FX rates allows for the bank to offer a more favorable FX rate to its customers as there is less risk involved with real time FX rate quoting resulting in a cost savings to the customer. The present invention provides the ability to issue foreign currency both check and wire settlements. Check settlements allow the customers to make payments where their beneficiary does not maintain an account with an overseas correspondent bank.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 3 illustrates the process carried out by the Trader System component of the present invention; and.

FIG. 4 depicts an example of the aggregation of a foreign exchange trade.

DETAILED DESCRIPTION OF THE INVENTION

Figure 1:
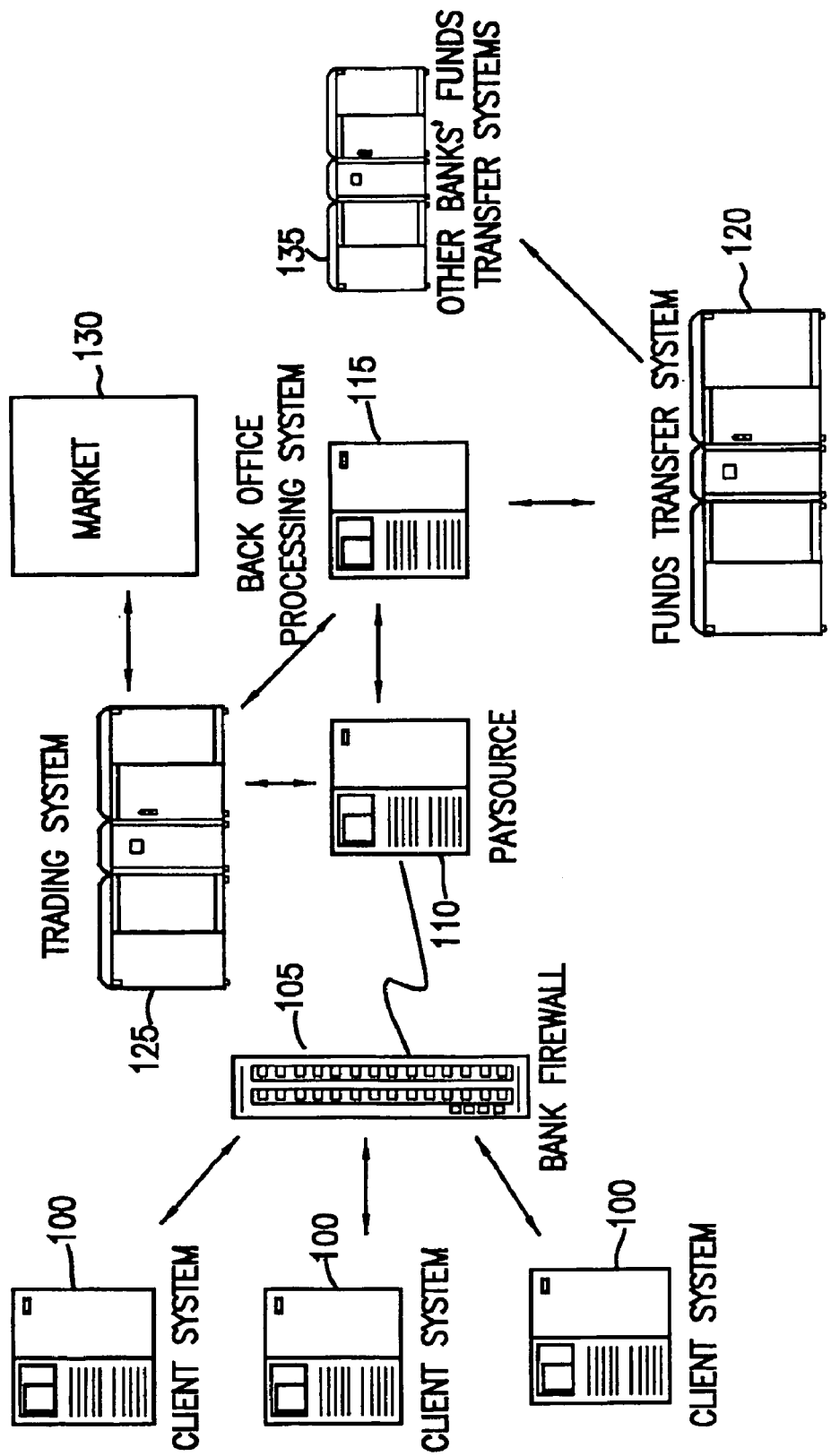
FIG. 1 illustrates the relationship between the customer, the customer interface, the trading system and external financial systems.

FIG. 1 illustrates the system of the present invention. Elements 100 represent customer's systems located at their facilities. Typically these systems 100 are financial systems of the customers such as the accounts receivable systems and are typically mainframe systems due the large amount of data stored in and processed thereby. The customer systems connect to the bank through the Internet or through a direct dial in line through a firewall 105 of the bank. The firewall 105 is a well known security device that prevents unauthorized users from gaining access to the internal bank systems.

Element 110, known as PaySource$^{SM}$, is the interface between the customers 100 and the funds transfer (115, 120) and foreign exchange portions (125) of the system of the present invention. PaySource$^{SM}$ 110 is where the majority of the processing of the present invention takes place. PaySource$^{SM}$ 110 includes the processors, software applications and databases that are used to the execute certain key aspects of the methods of the present invention. The processors included in the PaySource$^{SM}$ 110 system can either be networked servers or can be mainframe based due to the large volumes of transactions handled by PaySource$^{SM}$ 110.

For same currency payment transactions, the Back Office Processing System 115 serves as the front end to the Funds Transfer System 120. The Funds Transfer System 120 is conventional in the art and is the means by which the actual instructions for processing a transaction are processed. The Funds Transfer System 120 communicates the same currency payment instructions to the funds transfer systems of other banks 135 through, for example, the SWIFT (Society for Worldwide Interbank Financial Telecommunication) system.

For payments which require a foreign exchange, PaySource$^{SM}$ 110 interfaces with the foreign exchange Trading System 125. Although the PaySource$^{SM}$ system 110 is capable of operating with virtually any Trading System 125, in a preferred embodiment it operates with a Trading System 125 known as Chase Trader. Chase Trader is described in a publication "CHASE TRADE WINDOWS USER GUIDE", publication CTWUG.980220, 1998 which is hereby incorporated by reference. Once the Trading System 125 has completed the foreign exchange by executing a contract on the Market 130, it settles the payment instruction through the Back Office Processing System 115 and the Funds Transfer System 120. Although PaySource$^{SM}$ 110, Trading System 125, Back Office Processing System 115 and Funds transfer System 120 have been illustrated in the preferred embodiment of FIG. 1 as separate processing systems, one skilled in the art readily appreciates that these systems do not necessarily have to be configured as separate systems. Alternatively, the systems could be grouped into a single system depending on the volume of transactions being processed by the bank.

Figure 2:
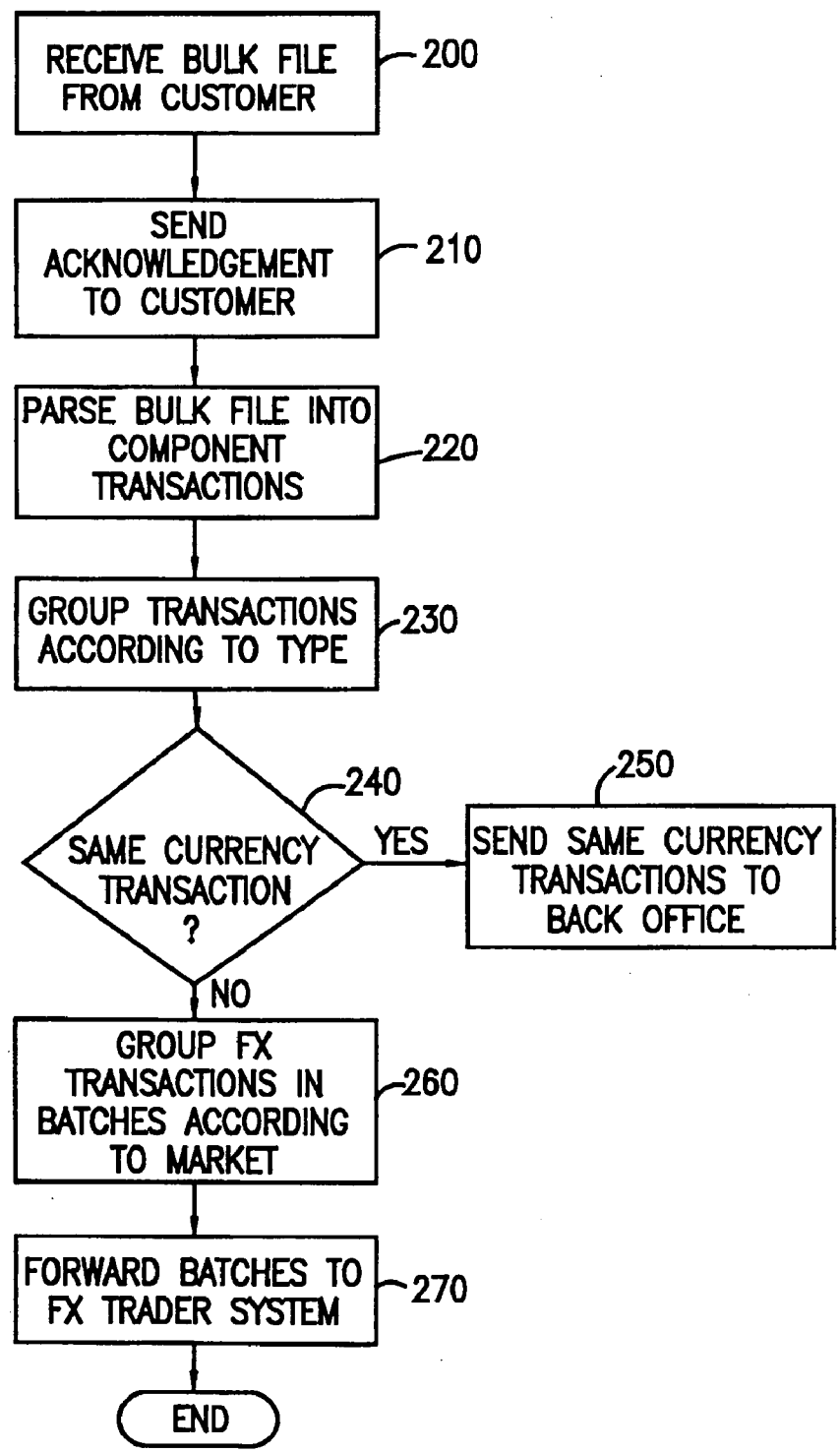
FIG. 2 depicts the process followed by the PaySource$^{SM}$ component of the present invention.

A customer 100 initiates the payment process by transmitting a bulk file containing instructions for several different types of payments to PaySource$^{SM}$ 110. PaySource$^{SM}$ 110 controls the receipt of transactions from the customers 100 and delivery of confirmations back to the client. The process followed by PaySource$^{SM}$ 110 is illustrated in FIG. 2. In step 200, PaySource$^{SM}$ 110 receives the bulk file from a customer 100. Upon receipt of a transaction file from a customer 100, PaySource$^{SM}$ 110 transmits an acknowledgment of the receipt of the file to the customer 100 (step 210). All direct interaction with the customers 100 takes place via PaySource$^{SM}$ 110. At a minimum, each of the payment instructions from the customer 100 must identify the amount of the payment, the customer's account number, the payment method (check, wire, cross border), information regarding the beneficiary and the value date. In addition, if the payment is going to require a foreign exchange, the customer 100 must identify the buy currency and the sell currency. One of the significant advantages of the present invention is that payments in a single transmission from the customer 100 may include Wires, Checks, Dollar to Dollar transfers, Dollar to foreign currency transfers, or Foreign Currency to Foreign Currency transfers. More significantly, through use of the present invention it is not necessary for the customers 100 to sort transactions by payment type.

The payment instructions from the customer 100 are formatted using the American National Standards Institute (ANSI) 820 standard. Table 1 indicates the segments and data elements included in the ANSI 820 format for the payment transactions from the customers 100 and examples of the data required for the for three different types of transactions. The first column in Table 1 contains the ANSI 820 segments and data elements, the second column contains the data required for a two party payment by check, the third column contains the data required for a three party payment by wire, and the fourth column contains the data required for a four party cross border payment by wire.

The following highlights some of the important segments and data elements included in the ANSI 820 message. Data element BPR02 identifies the amount of the transaction. Data element BPR04 identifies the ANSI validated payment vehicle, which is SWIFT in each of the examples this Table. BPR06 & BPR07 identifies the SWIFT ID of the bank back-office that will originate the transaction. The customer's account which is to be debited is housed at this back-office. BPR09 specifies the customer's debit account. BPR12 & BPR13 identify the ID of the initial credit bank and would normally be a SWIFT ID. The corresponding N1 block should have an N101 ID of RB. BPR16 identifies the requested settlement date. Up to 4 occurrences of the NTE02 field are allowed (35 characters each) for remitters text. TRN02 represents the originator's reference number. The Currency segment identifies the credit currency. REF02 identifies the pay method, CHK, WRE or CBW. Presently CHK is a 2 party payment, WRE is a 3 party payment and CBW is a 4 party payment. CHK could be used as a 3 Party payment by placing a mail to address in the N1RB segment. Within each N1 Segment: Either N102 (Name) or N103 (Qualifier) and N104 (ID Code) are required. In the 2nd N1 segment (N101=RB), if N102 is not available, N103 and N104 must be repeated from the BPR segment. The N1-RB segment identifies the initial credit bank. The N1-C1 segment identifies the 3rd party (2nd credit bank or beneficiary) to the transaction. The N1-C2 segment identifies the 4th party (beneficiary), if appropriate, to the transaction. As an alternative to the ANSI 820 message, other formats could be used such as UN/EDIFACT formatted messages.

When PaySource$^{SM}$ 110 receives an ANSI 820 from a customer, PaySource$^{SM}$ 110 parses the ANSI 820 message into its component transactions (step 220 in FIG. 2). Each of the transactions is then examined in order to determine the type of the transaction and accordingly determine the correct processing system in the bank to which the transaction should be forwarded (step 230). In order to determine the correct system to which the transaction should be forwarded, PaySource$^{SM}$ 110 examines the field in the transaction record containing the payment method. In the embodiment of the message format illustrated in Table 1, PaySource$^{SM}$ 110 examines data element BPR04 in order to determine the payment method of the transaction. The payment method found in this field dictates the system to which the transaction should be routed. The first group of transactions are same currency transactions and can be either Domestic Money Transfers (DMT) or Global Money Transfers (GMT). For DMT transfers the following types of transactions are supported: United States Dollar (USD) Drawdown (both Fed and Book); USD Fed; USD CHIPS (Clearing House Interbank Payment System); and USD Book. For GMT transfers, the following types of transactions are supported: TLX (telex); IAT (inter-account transfer); DFT (checks) GIRO (low value payments destined for in-country clearing systems, such as Post Offices); ATR (Advice to Receive) and GMT Drawdowns. The second group of transactions are FX payments that will require an FX contract to be executed prior to settlement.

Once PaySource$^{SM}$ 110 has separated the payments in to same currency DMT/GMT transactions and FX payments (step 240), the same currency transactions are forwarded to the Back Office Processing System 115 for execution by the Funds Transfer system 120 and settlement with the Other Banks' Funds Transfer Systems 135 (step 250). This same currency payment processing is performed by traditional funds transfer methods and shall not be further described. The FX payments parsed from the ANSI 820 transmission from the customer 100 are forwarded to the Trading System 125 for execution of the foreign exchange contract. The remainder of this discussion will relate to the payments which require the execution of a foreign exchange contract prior to the payment being executed.

FX payments from each customer ANSI 820 are grouped into a single "batch" which is delivered by PaySource$^{SM}$ 110 to the Trading System 125 for processing (steps 260, 270). As it transfers the batch file, PaySource$^{SM}$ 110 notifies Trader System 125 that the transactions are available for processing. All payments in a single batch are targeted for the same Market for foreign exchange. Market refers to the market where the foreign exchange contract is actually executed and the preferred embodiment of the present invention there are two Markets, one in New York and one in London. Furthermore, in the preferred embodiment the customer has an established profile with the bank in which the market preferred by the customer is preset.

Batches are transferred from PaySource$^{SM}$ 110 to the Trading System 125 in a file having the format illustrated in Table 2. As seen in Table 2, the message from PaySource$^{SM}$ 110 to the Trading System 125 includes a header section (which contains a field indicating the market to which each of the transactions in the batch are destined) a details section and a trailer section. The details section of the message is repeated for each of the transactions contained in the batch and includes all of the details regarding the transaction (e.g., amount, account, buy currency, sell currency . . . ) For example, if there are fifteen transactions there are fifteen details sections contained in the message. The trailer portion of the message is used to verify that the message contained the correct number of transactions. In the above example, the Number-records field would indicate that fifteen transactions should have been included in the message. If the number of transactions indicated in the trailer does not equal the number of transactions actually read by the Trading System 125, then an error is generated.

Figure 3:
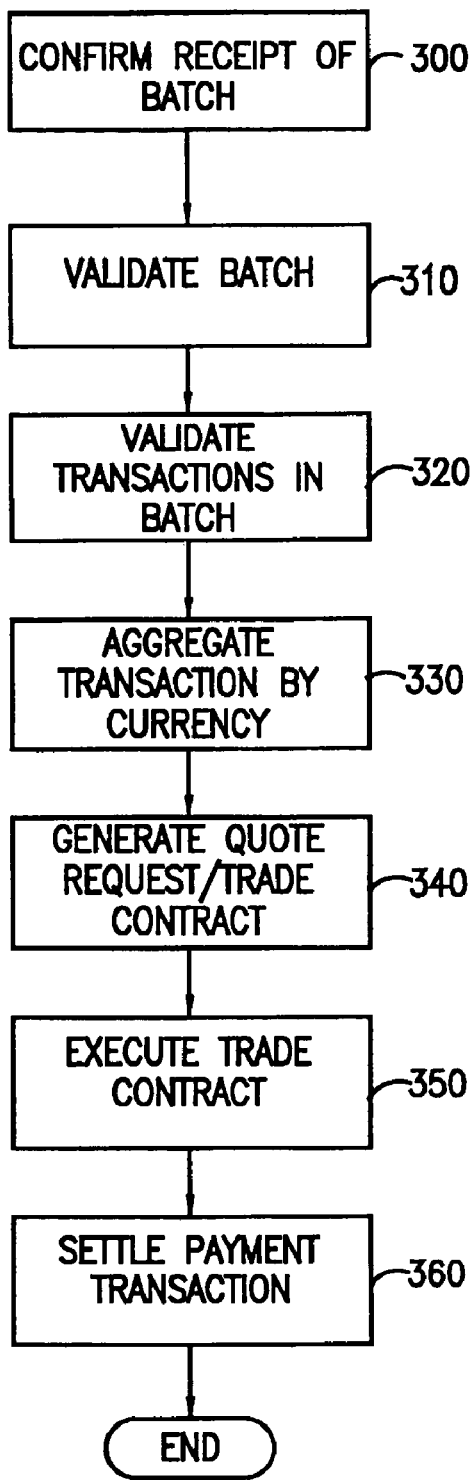

The process followed by Trader System 125 is illustrated in FIG. 3. Once Trader System 125 has received a batch, Trader System 125 sends PaySource$^{SM}$ 110 a confirmation of the receipt of the batch (step 300). In this manner, all customer payments can be tracked throughout their processing by the system. The confirmation from Trading System 125 to PaySource$^{SM}$ 110 consists of the following data items: a status indicating that Batch was received; and a unique BatchID that is used to reference the batch. The BatchID consists of a customer ID, file date, file time, and file number. The BatchID is used in subsequent processes to reference the batch of payments and any associated trades. In cases where a batch has already been sent, the batch will be rejected outright, and notification will be sent back to PaySource$^{SM}$ 110 stating that the batch is a duplicate.

If multiple batches are delivered to Trading System 125, the batches will be processed in the order received. Once the batch has been assigned a unique BatchID and is determined not to be a duplicate, the batch is syntax/value checked first at the batch level (step 310) and then at the details level (step 320). Syntax/value checking up front is intended to weed out obvious discrepancies as soon as possible since such defects would most likely adversely affect subsequent processing.

In step 320, the first validation of a batch which occurs is ensuring that the batch has not been previously sent to the Trader System 125. As previously described, if the batch is a duplicate, it is rejected and PaySource$^{SM}$ 110 is notified of the duplicate batch transmission. A second validation ensures that the number of payments sent by PaySource$^{SM}$ 110 in the batch is equal to the number of payments received by Trader System 125. This validation is accomplished by matching the trailer count (see Table 2) to the number of payments actually received by Trade System 125. Trader System further checks the Sender Id field of the batch is set equal to "PaySource$^{SM}$" and the Receiver Id field of the Batch set equal to "Trader System". Finally, Trader System 125 verifies that the requested market is one to which Trader System 125 has access. Any failure of the above described validation at the batch level will result in Trader System 125 rejecting the entire batch and all associated payments.

Once validation has occurred on a batch level, Trader System 125 proceeds in step 320 to validate the details of the individual payments within the batch. As each payment is validated, it will be marked as either accepted or rejected. If a payment is rejected, it will have no impact on the other payments in the batch. As will be further described below, notification of rejected payments in the form of an ANSI 824 message will be sent to the customer 100 for these payments with a status of "Rejected."

The following validations will take place on the payments within the Batch:

| | |
|---|---|
| Sell Account: | This field has to be included in the payment; |
| Buy Currency: | This field has to be included in the payment, it cannot be equal to the Sell Currency and must be a valid SWIFT Currency; |
| Sell Currency: | This field has to be included in the payment, it cannot be equal to the Buy Currency and must be a valid SWIFT Currency; |
| Amount: | The value of the payment must be greater than 0 |
| Amount Qualifier: | Must be either BY (buy) or SE (sell); |
| By Order of 1: | This is an optional field in which the name of the customer can be supplied. If it is not provided, the customer's name is retrieved from a Customer Database; |
| By Order of 2–3: | This is an optional field that defaults to the customer's address contained in the Customer Database; |
| Beneficiary 1: | This is a name field that is required for Wires, Cross Border Wires and Checks; |
| Beneficiary 2–4: | This is an address field that is required for Wires, Cross Border Wires and Checks; |
| Bene Bank Id: | This is field containing the SWIFT ID of the beneficiary bank which is required for Wire or Cross Border Wire (CBW) transactions if Bene Bank Address (see Bene Bank 1–3 below) was not sent. Not allowed for Checks; |
| Bene Bank 1–3: | This is an address field that is required for Wires and CBWs if Bene Bank Swift Id not sent. Not allowed for Checks; |
| Pay Method: | WRE (Wire), CHK (Check) or CBW; |
| Bene Account: | Optional for Wires and Checks, required for Cross Border Wires; |
| Corresp Charges: | Equal to either "B" or "R"; |
| Correspondent 1: | This field contains the SWIFT ID and is not allowed for Wires or Checks. For CBWs, required if Correspondent Address not sent; |
| Correspondent 2–4: | This is an address field that is not Allowed for Wires. For CBWs it is required if Correspondent Swift Id not sent; |
| BankID: | This is a required field identifying the bank at which the customer's account is held; |
| Value Date: | This is a required field must contains a valid date; and |
| Date: | The date of the payment instruction must be in CCYYMMDD format. |

Individual payments within the batch are validated as syntactically correct as described above and valid payments are passed to an Aggregation process. Groups of payments which require a foreign exchange from the same sell currency into the same buy currency are aggregated in step 330 so that a single contract can be formulated to conduct the FX trade. Payments are aggregated by currency pair, amount qualifier, value date, and account number. For batches which have account allocation enabled (see below), the allocation account rather than the sell account will be included in the aggregation criteria. The payments are then aggregated into trades to be contracted in later processes. Each aggregated trade is uniquely identified for reference by subsequent processes.

FIG. 4 illustrates an example of the aggregation process. As seen in this Figure, a batch from the customer 100 includes at least seven different payment transactions which require FX trades. The transactions include four payments, 200, 202, 210, and 212 to party A, one payment 204 to party B and two payments 206 and 208 to party C. Four of the payments, 200, 204, 206 and 210 are to be made British pounds and three of the payments, 202, 208 and 212 are to be in Deutschmarks. Five of the payments are to be made from one account (A123) held by the customer 100 and the other two are to made from a second account (B456) of the customer 100.

As previously described, two of the variables on which FX trades are aggregated are the currency pairs and the account. Accordingly, the three payments which are to made in pounds from account A123 (payments 200, 204 and 206) are aggregated into a single trade 214 for a total trade of 30 GBP. Similarly, the two payments 202 and 208 from account A123 are aggregated into a single FX contract 218 for 20 DEM. As there are only two payments in different currencies from account B456, these trades are not aggregated. As can be readily seen from this example, the aggregation process of the present invention results in significant savings for the customer 100 as only four trades are required instead of the seven which would be dictated by the seven separate payments. As banks typically charge customers 100 a fee for each trade, the aggregation process saves the customer 100 significantly on these fees.

In the above example depicted in FIG. 4, it is possible that trades with the same currency pair (i.e., the two GBP trades 214 and 216) would return different FX rates due to two separate contracts being requested.

The aggregation example illustrated in FIG. 4 assumes that the customer 100 does not have account allocation enabled (as evidenced by the different account numbers associated with the same currencies). As seen in Table 2, an allocation account can be used for conducting several trades in the same currency. If the customer requests that account allocation be enabled, =PaySource$^{SM}$ 110 populates the Allocation Account field in the file it transmits to Trader system 125. The Allocation Account field is populated with the customer's account from which same currency FX trades are to conducted. When enabled, the Allocation Account will be used in place of the Sell Account in the above described aggregation procedure. Trader System 125 subsequently generates the book-to-book transfers for the accounts indicated in the details section of the batch file from PaySource$^{SM}$ 110.

In the above aggregation example depicted in FIG. 4, one allocation account would be associated with each currency, the result being that only two trades would have to take place instead of depicted four 214–220 (i.e., one trade for 40 GBP, and one for 30 DEM).

Returning to FIG. 3 and step 340, once the transactions in a batch have been aggregated into a minimal number of trades, the trades are termed Aggregate Quote Requests. The next step in the process is that trade contracts are built based on the Aggregate Quote Requests. The FX contracts are executed by Trading System 125 prior to sending any settlement/payment instructions to the Back Office Processing System 115 for settlement. If a Aggregate Quote Request or an eventual Contract is rejected for any reason besides resource availability, all associated payments will be rejected as well. Rejection error codes are assigned to the Trade and all associated payments.

An Aggregated Quote Request is then turned into a Trade Contract. The Trade Contract is assigned a contract number and its status is listed as Pending (see below). If the Trade Contract is accepted by the bank (i.e., it can undertake to make the trade as requested by the customer) the status of the Trade Contract is changed to "Accepted". If a Trade Contract is rejected, the Trade Contract and all of the customer's payments associated with the trade Contract are updated with a rejected status.

There are two methods by which a rate can be applied to a contract. First, the traditional method is to apply a static foreign exchange rate to the Trade Contract. Alternatively, the present invention has the ability to apply a real time foreign exchange rate. This rate is obtained on a real time basis from the Market 130 (see FIG. 1). The application of a real time rate allows the bank to offer a lower processing fee to the customer 100 since the accuracy of the real time rate reduces the risk taken by the bank in accepting the Trade Contract. This reduction in risk for the bank can be passed onto the customer 100 in the form of the lower fee. Once a rate has been applied to a Trade Contract, the Contract is actually executed in the Market 130 (step 350). The funds resulting from the trade, in the currency of the eventual payment are now available for settlement of the original payment request by the customer 100.

There are circumstances when required system resources are not available for executing contracts. In this case, the Batch is assigned a "Pending" status until the availability issues are resolved. Conditions that will result in a pause in processing include the Market 130 being closed or interruptions in the Trading System 125. A running conversation between the Trading System 125 and the Market 130 will report statuses such as market availability. These statuses will be checked prior to attempting to contract trades within a batch. If the market is closed, the batch and all associated payments will be marked with a status of "Pending" and will be processed when the market is reopened. If a batch is partially processed due to the absence of subsystems or market closure, the batch will restart processing when those resources become available.

Once a Contract has been successfully executed as described above, the contract details are applied to the payments associated with the Batch represented by the Contract. Trading System 125 then sends the payments to the Back Office Processing System 115 for settlement in step 360. The contract details indicates to the Back Office Processing System 115 the source of the funds for the payment. If the payment method is Wire or Cross Border Wire the Back Office Processing System 115 settles the payment through the Funds Transfer System 120 in conjunction with the Other Banks' Funds Transfer Systems 135. If the payment method is Check, the Back Office Processing System 115 issues check in the name of the beneficiary which is then sent to the beneficiary. The Check procedure is useful when the beneficiary does not maintain an account with an overseas correspondent bank. After the settlement is complete, the Back Office Processing System 115 informs the Trading System by returning the respective settlement confirmations. The status of the associated payments are then updated as being "Complete."

The above described process of contracting and settlement continues until all contracts and payments in the Batch have been processed, either successfully or as rejects. Once the entire batch has been processed by Trader System 125, confirmations are generated Trader System 125 and returned to PaySource$^{SM}$ 110 as a completed batch acknowledgment. Table 3 contains an example of the confirmation file sent from Trader System 125 to PaySource$^{SM}$ 110. When a batch is confirmed as complete with no interruptions PaySource$^{SM}$ 110 generates a confirmation to the customer 100 using ANSI 824 format for all of the payments in the batch. When a batch is confirmed as partially complete PaySource$^{SM}$ 110 generates an ANSI 824 to the customer 110 for each of the payments in the batch that have been processed, with a status of "complete." PaySource$^{SM}$ 110 will also generate ANSI 824s for those payments which have not yet been processed, and inform the customer that the status of these payments is "Pending." When a batch previously confirmed as being partially complete is finally confirmed as Complete, PaySource$^{SM}$ 110 generates ANSI 824s for all of the payments in the Batch which were pending. The completed ANSI 824 confirm for those previously pending transactions will include the following fields generated by the contract for each payment: Rate, Contract Number, Settlement CCN, Contra-Amount, Check Serial Number (where applicable).

A database is maintained which contains the statuses of all the payments and batches existing in the system at any given time. A customer service representative can answer a customer's inquiry as to the status of a transaction by checking the status of any batch which has been received by Trading System 125. Batch Statuses include: Received, which indicates that the batch has been received by Trader System 125; Accepted/Rejected, which indicates that the batch-level checks described above have been completed, in which case the batch and all its associated payments are either Accepted or Rejected; Pre-Edited, which indicates that the payments have been syntax/value checked and individually marked as Accepted/Rejected; Aggregated, which indicates that the Aggregated Quote Request has been built; Pending, which indicates that FX contract is pending (e.g., if the Market is down); and Complete, which indicates that the entire batch as been contracted and settled.

TABLE 1

| ANSI Segment | 2 Party Payment Check | 3 Party Payment Wire | 4 Party Payment Cross Border Wire |
|---|---|---|---|
| ISA: | | | |
| GS: | | | |
| ST: | | | |
| ST01 | 820 | 820 | 820 |
| ST02 | Seq. # | Seq. # | Seq. # |
| BPR: | | | |
| BPR01 | D | D | D |
| BPR02 | Amount | Amount | Amount |
| BPR03 | C | C | C |
| BPR04 | SWT | SWT | SWT |
| BPR05 | NA | NA | NA |
| BPR06 | 02 | 02 | 02 |
| BPR07 | CHASCNYXXXX | CHASCNYXX-XX | CHASCNYXXXX |
| BPR08 | NA | NA | NA |
| BPR09 | Dr DDA | Dr DDA | Dr DDA |
| BPR10 | 3999999999 | 3999999999 | 3999999999 |

TABLE 1-continued

| ANSI Segment | 2 Party Payment Check | 3 Party Payment Wire | 4 Party Payment Cross Border Wire |
|---|---|---|---|
| BPR11 | NA | NA | NA |
| BPR12 | NA | 02 | 02 |
| BPR13 | NA | SWIFT ID | SWIFT ID |
| BPR14 | NA | NA | NA |
| BPR15 | NA | NA | NA |
| BPR16 | VDATE | VDATE | VDATE |
| NTE: | | | |
| NTE01 | ZZZ | ZZZ | ZZZ |
| NTE02 | Text | Text | Text |
| NTE01 | ZZZ | ZZZ | ZZZ |
| NTE02 | Text | Text | Text |
| NTE01 | ZZZ | ZZZ | ZZZ |
| NTE02 | Text | Text | Text |
| NTE01 | ZZZ | ZZZ | ZZZ |
| NTE02 | Text | Text | Text |
| TRN: | | | |
| TRN01 | 1 | 1 | 1 |
| TRN02 | Ref # | Ref # | Ref # |
| CUR: | | | |
| CUR01 | ZZ | ZZ | ZZ |
| CUR02 | Cr Curr | Cr Curr | Cr Curr |
| REF: | | | |
| REF01 | 1Z | 1Z | 1Z |
| REF02 | CHK | WRE | CBW |
| REF03 | Charges | Charges | Charges |
| N1(1): | | | |
| N101 | PR | PR | PR |
| N102 | Your Company | Your Company | Your Company |
| N1(2): | | | |
| N101 | PE or RB | RB | RB |
| N102 | Bene Name | Cr Bank Name | Cr Bank Name |
| N2(2): | | | |
| N201 | Add1 Name | Add1 Name | Add1 Name |
| N202 | Address | Address | Address |
| N1(3): | | | |
| N101 | | C1 | C1 |
| N102 | | 3rd Name | 3rd Name |
| N103 | | ZZ | ZZ |
| N104 | | 3rd Acct | 3rd Acct |
| N2(3): | | | |
| N201 | | Add1 Name | Add1 Name |
| N202 | | Address | Address |
| N1(4): | | | |
| N101 | | | C2 |
| N102 | | | 3rd Name |
| N103 | | | ZZ |
| N104 | | | 3rd Acct |
| N2(4): | | | |
| N201 | | | Add1 Name |
| N202 | | | Address |
| SE: | | | |
| SE01 | # Segmnts | # Segmnts | # Segmnts |
| SE02 | Ctl. # | Ctl. # | Ctl. # |
| GE: | | | |
| IEA: | | | |

TABLE 2

| CTS Flat File Field | Information | ANSI Source 2 Party | ANSI Source 3 Party | ANSI Source 4 Party |
|---|---|---|---|---|
| Header: | | | | |
| Record-ID | "01" | Hardcode | Hardcode | Hardcode |
| File-Date | CCYYMMDD | | | |
| File-Time | HHMMSS | | | |
| File-Description | "PaySource SM CTS" | Hardcode | Hardcode | Hardcode |
| File-Number | start at 00001 daily | | | |
| Sender-ID | "PaySource SM" | Hardcode | Hardcode | Hardcode |
| Receiver-ID | "Trader System" | Hardcode | Hardcode | Hardcode |
| Customer-ID | CCAP Customer ID | | | |
| Market | CHASCNYXXX X = NY CHASGB2 LXXX = LON | From BPR07: CHASC NYXXX X = NY Anything Else = LON | From BPR07: CHASC NYXXX X = NY Anything Else = LON | From BPR07: CHASC NYXXX X = NY Anything Else = LON |
| Filler | Spaces | | | |
| Detail: | | | | |
| Record-ID | "05" | Hardcode | Hardcode | Hardcode |
| Customer Ref. | Cust ref number | TRN02 | TRN02 | TRN02 |
| Bank ID | CHASCNYXXX X = NY CHASGB2 LXXX = LON Other = Multibank | BPR07 | BPR07 | BPR07 |
| Account Number | Right Just., space fill | BPR09 | BPR09 | BPR09 |
| Amount | Left Just., zero fill | BPR02 | BPR02 | BPR02 |
| Amount Qualifier | BY = Buy; SE = Sell | CUR01 | CUR01 | CUR01 |
| Buy Currency | Credit Currency | CUR02 | CUR02 | CUR02 |
| Sell Currency | Debit Currency | CUR02 | CUR02 | CUR02 |
| Value Date | CCYYMMDD | BPR16 | BPR16 | BPR16 |
| Pay Method | MTS Pay Method | REF02 (1Z) CHK | REF02 (1Z) WRE | REF02 (1Z) CBW |
| Allocation Account | Alt. Allocation # | Future | Future | Future |
| By Order of 1 | | N1 Loop, CDB | N1 Loop, CDB | N1 Loop, CDB |
| By Order of 2 | | N1 Loop, CDB | N1 Loop, CDB | N1 Loop, CDB |
| By Order of 3 | | N1 Loop, CDB | N1 Loop, CDB | N1 Loop, CDB |
| Bene Account | | Blank | N104 (C1) | N104 (C2) |
| Beneficiary 1 | | N102 (PE) | N102 (C1) | N102 (C2) |
| Beneficiary 2 | | N201 (PE) | N201 (C1) | N201 (C2) |
| Beneficiary 3 | | N202 (PE) | N202 (C1) | N202 (C2) |
| Beneficiary 4 | Reserved | | | |
| Beneficiary 5 | Reserved | | | |
| Beneficiary 6 | Reserved | | | |
| Bene Bank ID | Not extracted? | Blank | BPR13 | N104 (C1) |
| Bene Bank 1 | | Blank | N102 (RB) | N102 (C1) |
| Bene Bank 2 | | Blank | N201 (RB) | N201 (C1) |
| Bene Bank 3 | | Blank | N202 (RB) | N202 (C1) |
| Bene Bank 4 | | Blank | Blank | Blank |
| Correspondent ID | Not Imported? | Blank | Blank | BPR13 |
| Correspondent 1 | | Blank | Blank | N102(RB) |
| Correspondent 2 | | Blank | Blank | N201(RB) |
| Correspondent 3 | | Blank | Blank | N202(RB) |
| Correspondent 4 | | Blank | Blank | Blank? |
| Remitters Text 1 | | NTE02 (1) | NTE02 (1) | NTE02 (1) |
| Remitters Text 2 | | NTE02 (2) | NTE02 (2) | NTE02 (2) |
| Remitters Text 3 | | NTE02 (3) | NTE02 (3) | NTE02 (3) |
| Remitters Text 4 | | NTE02 (4) | NTE02 (4) | NTE02 (4) |
| Debit Bank Charges | "B or R" | REF03 (1Z) | REF03 (1Z) | REF03 (1Z) |
| Corresp Charges | "B or R" | REF03 (1Z) | REF03 (1Z) | REF03 (1Z) |
| Trailer: | | | | |
| Record-ID | "99" | | | |
| Number-records | Count of "05" recs | | | |

TABLE 3

| Field Descr. | Value | Comments |
|---|---|---|
| File Header: | | |
| Record-ID | "01" | |
| File-Date | CCYYMMDD | |
| File-Time | HHMMSS | |
| File-Description | "CTS Acknowledgements" | |
| File-Number | 00001 | incremented each time file sent |
| Sender-ID | "Trader System" | |
| Receiver-ID | "PaySource SM" | |
| Filler | | |
| Batch Header: | | |
| Record-ID | "03" | |
| Customer-Id | | Company Id |
| Customer-Name | | Company Name |
| BatchID | | |
| Filler | | |
| Detail: | | |
| Record-ID | "05" | |
| Input-Date | | |
| Value-Date | | |
| Release-Date | | |
| Buy Currency | | |
| Your-Ref-No | 999999999 | from trans. as input |
| CTS-CCN-No | | Application CCN |
| Sell Account | | |
| Bene/Rec-Bank | | |
| Pay-Type | | |
| Pay/Receive | | |
| Buy Amount | | |
| Contract | | Ex. CTS Contract # |
| Rate | | Ex. CTS Rate |
| Sell Contra-Amount | | |
| Status | | |
| Confirmation-level | TN, ZZ, EM, etc | TN = Level 2 ZZ = Level 3 EM = Level 4 |
| Error-Message | Application Error Message | If there is no trans., reason for reject |
| Check-Number | | |
| Batch Trailer: | | |
| Record-ID | "90" | |
| Number-of-Details | | |

TABLE 3-continued

| Field Descr. | Value | Comments |
| --- | --- | --- |
| Filler | | |
| File Trailer: | | |
| Record-ID | "99" | |
| Number-of-Batches | | |
| Number of Details | | |
| Filler | | |

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A system for processing funds transfer transactions from a customer of a financial institution, the system comprising:
   a first processor receiving a bulk file from the customer, the bulk file containing a plurality of funds transfer transactions, the first processor grouping the plurality of funds transfer transactions into funds transfer transactions requiring a foreign exchange operation, denoted as foreign exchange funds transfer transactions, and funds transactions not requiring a foreign exchange operation, denoted as same currency funds transfer transaction;
   a second processor coupled to the first processor, the second processor receiving the same currency funds transfer transactions not requiring a foreign exchange operation from the first processor, the second processor generating first funds transfer instructions in response to the same currency funds transfer transactions;
   a funds transfer processor coupled to the second processor, the funds transfer processor receiving the first funds transfer instructions from the second processor and executing the received first funds transfer instructions by transferring funds to a funds transfer processor of another financial institution; and
   a trading processor coupled to the first processor, the trading processor receiving the foreign exchange funds transfer transactions from the first processor, the trading processor executing a foreign exchange operation in response to the received foreign exchange funds transfer transactions.

2. The system according to claim 1, wherein:
   the trading processor is coupled to the second processor,
   the trading processor forwarding to the second processor the foreign exchange funds transfer transactions and funds resulting from the foreign exchange operation,
   the second processor generating second funds transfer instructions in response to the foreign exchange funds transfer transactions and funds resulting from the foreign exchange operation, and
   the funds transfer processor receiving the second funds transfer instructions from the second processor and executing the received second funds transfer instructions by transferring funds to a funds transfer processor of another financial institution.

3. The system according to claim 1, further comprising:
   a link coupling the first processor to a system of the customer, wherein the customer system transmits the bulk file to the first processor.

4. The system according to claim 3, further comprising:
   a firewall disposed in the link coupling the first processor to the customer system.

5. The system according to claim 1, further comprising:
   a market link from the trading processor to a foreign exchange market, wherein the trading processor receives real time foreign exchange rates over the link.

6. A method for processing funds transfer transactions from a customer of a financial institution using a processor-based system, the method comprising the steps of:
   receiving a bulk file from the customer, the bulk file containing a plurality of funds transfer transactions;
   grouping the plurality of funds transfer transactions into funds transfer transactions requiring a foreign exchange operation, denoted as foreign exchange funds transfer transactions, and funds transfer transactions not requiring a foreign exchange operation, denoted as same currency funds transfer transactions;
   executing a foreign exchange operation in response to the foreign exchange funds transfer transactions to thereby generate available funds; and
   settling the foreign exchange funds transfer transactions using the available funds.

7. The method according to claim 6, further comprising the steps of:
   generating funds transfer instructions in response to the same currency funds transfer transactions; and
   settling the same currency funds transfer transactions in response to the funds transfer instructions.

8. The method according to claim 6, further comprising the step of:
   separating the bulk file into its component funds transfer transactions, the component funds transfer transactions including the foreign exchange funds transfer transactions and the same currency funds transfer transactions.

9. The method according to claim 6, further comprising the step of sending an acknowledgments to the customer upon receipt of the bulk file and upon the settlement of the funds transfer transactions.

10. The method according to claim 6, further comprising the step of grouping the foreign exchange funds transfer transactions into batches according to a market in which the foreign exchange operation is to take place.

11. The method according to claim 10, further comprising the step of validating the format and contents of the batches.

12. The method according to claim 11, further comprising the step of validating the format and contents of the foreign exchange funds transfer transactions contained in the batches.

13. The method according to claim 10, further comprising the step of aggregating the foreign exchange funds transfer transactions contained in the batches according to a currency of the foreign exchange operation.

* * * * *